United States Patent [19]

Terragni

[11] 4,113,411
[45] Sep. 12, 1978

[54] EXTRUDER AND SIZER APPARATUS FOR HOLLOW PLASTIC SECTIONS

[76] Inventor: Marco Terragni, Via Puccini, 5 Milan, Italy

[21] Appl. No.: 680,269

[22] Filed: Apr. 26, 1976

[30] Foreign Application Priority Data

May 2, 1975 [IT] Italy .................. 22952 A/75

[51] Int. Cl.² ............ B29F 3/03; B29F 3/04
[52] U.S. Cl. .................. 425/325; 425/380; 425/394; 425/467; 425/812
[58] Field of Search ........... 425/325, 343, 380, 394, 425/404, 446, 467, 812

[56] References Cited

U.S. PATENT DOCUMENTS

| | | | |
|---|---|---|---|
| 3,635,615 | 1/1972 | Hartmann et al. | 425/325 |
| 3,792,951 | 1/1972 | Meyers | 425/380 |
| 3,879,508 | 4/1975 | Gilbert | 425/325 |
| 3,899,276 | 8/1975 | Sokolow | 425/380 |

Primary Examiner—Francis S. Husar
Assistant Examiner—John McQuade
Attorney, Agent, or Firm—Guido Modiano; Albert Josif

[57] ABSTRACT

An apparatus, particularly for manufacturing hollow sections of a plastic material, comprising an extruder head for extruding a section and a gauger or sizer downstream of said extruder head. The gauger comprises a lower chamber and an upper chamber communicating to a vacuum source. The lower and upper chambers are respectively closed by a substantially plate-like lower member and substantially plate-like upper member respectively contacting the lower face and the upper face of the section extruded by the extruder head. The substantially plate-like lower and upper members comprise a plurality of bars arranged side by side and spaced apart such as to define slots therebetween for communicating respectively with the lower chamber and upper chamber. The bars extend along a substantially perpendicular direction with respect to the extruded section direction of advance.

9 Claims, 7 Drawing Figures

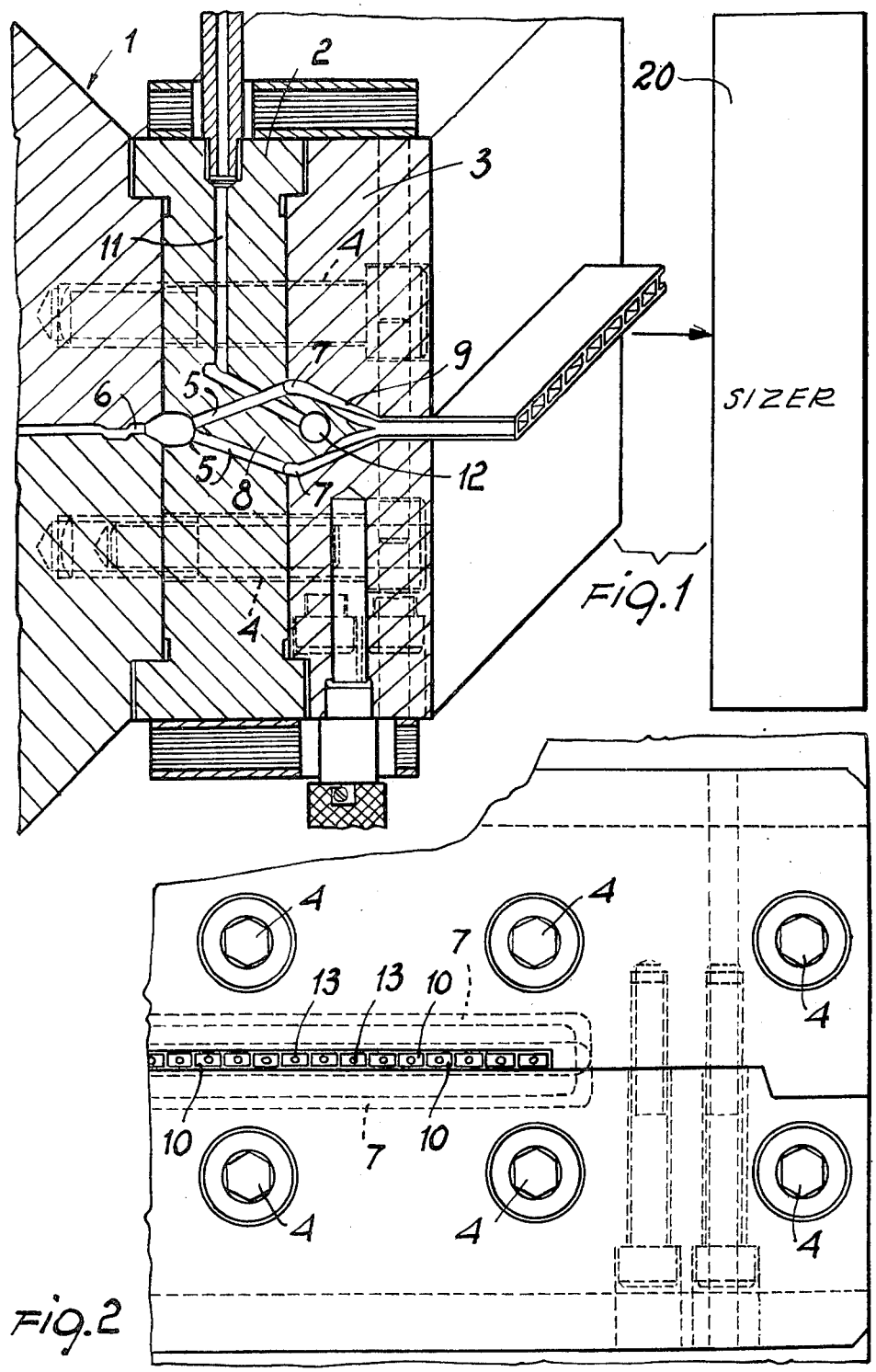

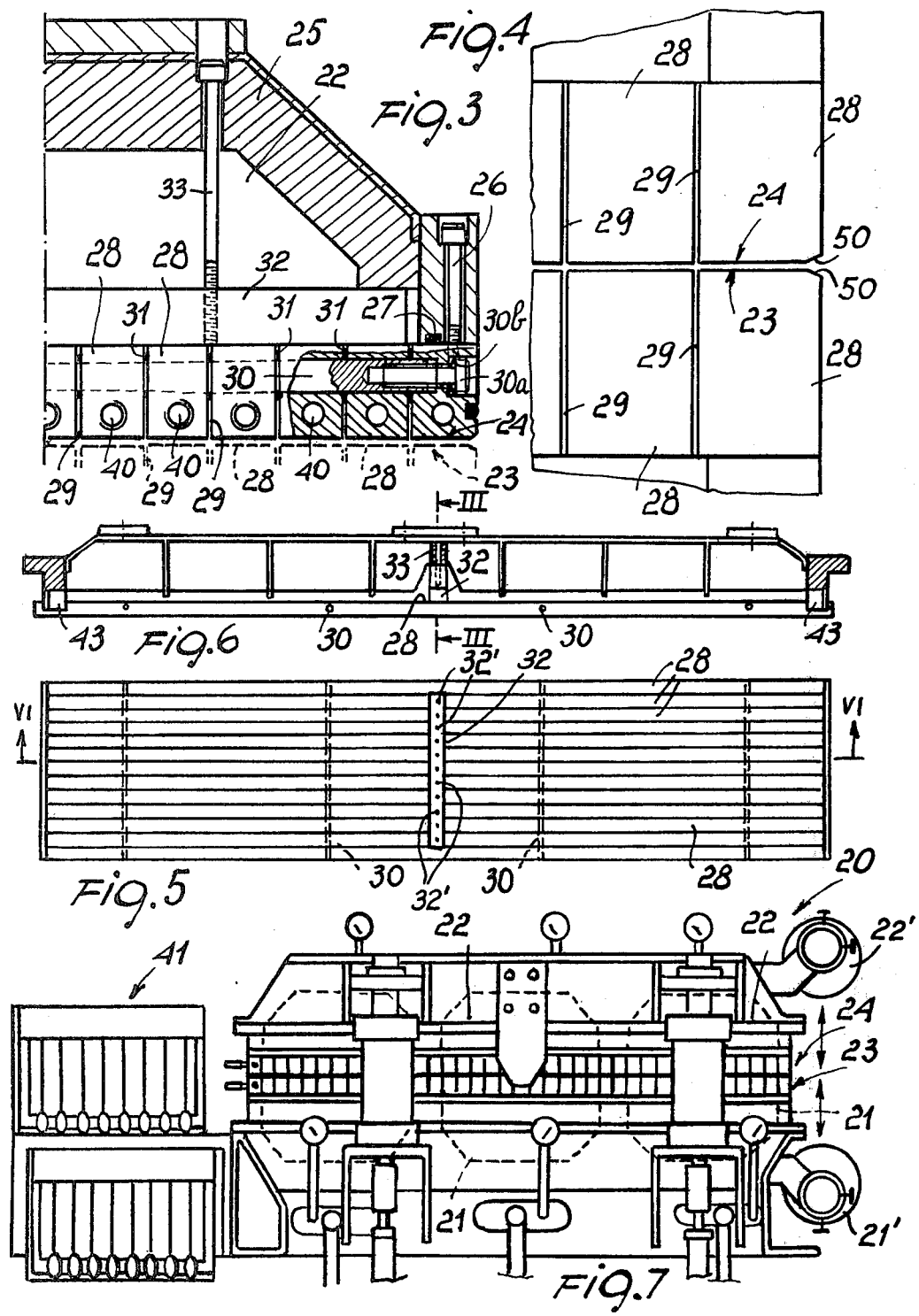

EXTRUDER AND SIZER APPARATUS FOR HOLLOW PLASTIC SECTIONS

BACKGROUND OF THE INVENTION

This invention relates to a system particularly for manufacturing hollow sections such as boards of a plastic material.

Prior art systems for manufacturing plastic material sections and panels are comprised of an extruder head for extruding the sections or panels and of a gauger or sizer, located downstream of said head and performing the functions of cooling the extruded section flowing out of the extruder head and of making it dimensionally stable. Such known systems, while generally successful, have proved in many instances deficient in versatility since, for example, when it was desired to change the shape or dimensions of the section or panel extruded from the head, it became necessary to replace as a whole the extruder head, thus adversely affecting the economy of the process, as an extensive range of extruder heads were required to meet the various market requirements.

Another strongly felt drawback resides in the gauger, i.e. in that part of the system which, as mentioned above, effectively controls the extruded section or panel dimensional stability. The gauger is comprised of a lower chamber and an upper chamber communicating to a vacuum source and closed, respectively, by a bottom plate and top plate which are caused to contact the lower and upper faces of the extruded section or panel and are effective to cool it gradually as well as to make the two faces of the section perfectly flat. Such plates are generally a single piece construction provided with a number of ports, in the form of holes or slots, for communicating to said upper and lower chambers. However, since as mentioned previously, said plates were a single piece construction, it happened that, owing to the high extruded section or panel temperature, thermal gradients occurred at the extruder head outlet between the various points in the plates; such thermal gradients, due to the unavoidable expansion of the plates, tended to distort the plates, which adversely affected the section finish.

Indeed, the plate internal stresses, as caused by the thermal gradient at the various points in the plates, resulted in a loss of flatness by the plates, such that the section or panel extruded by the extruder head was also affected, resulting in a loss of uniformity in the dimensional stability.

SUMMARY OF THE INVENTION

It is accordingly a primary object of this invention to obviate such prior art drawbacks by providing a system for manufacturing extruded sections, and in particular hollow sections, i.e. sections comprised of two thin parallel walls connected together by cross ribs such as to form a honeycombed structure provided with a plurality of parallel channels, and capable of being adapted, with simple and quick modifications, for manufacturing sections of different shapes and dimensions.

It is a further object of the invention to provide a system which in addition to being adaptable to any applicational requirements, positively ensures at all times a perfect finish of the final product.

Another object of the invention is to provide a system for manufacturing plastic material sections which requires no special maintenance and has a highly competitive cost.

These and other objects, such as will be apparent hereinafter, are achieved by a system particularly for manufacturing hollow sections of a plastic material, according to the invention, comprising an extruder head for extruding a section and a gauger downstream of said extruder head, said gauger being comprised of a lower chamber and an upper chamber communicating to a vacuum source, said lower and upper chambers being respectively closed by a substantially plate-like lower member and substantially plate-like upper member respectively contacting the lower face and upper face of the section extruded by said extruder head, characterized in that said substantially plate-like lower and upper members comprise a plurality of bars arranged side by side and spaced apart such as to define slots therebetween for communicating respectively to said lower chamber and upper chamber, said bars extending along a substantially perpendicular direction with respect to said extruded section advance direction.

BRIEF DESCRIPTION OF THE DRAWINGS

Further features and advantages will become apparent from the following description of a preferred, though not exclusive, embodiment of a system for manufacturing plastic material sections, shown by way of illustration and not of limitation on the accompanying drawings, where:

FIG. 1 is a cross-sectional view of an extruder head showing diagrammatically the sizer downstream thereof;

FIG. 2 is a front view of a portion of the extruder head;

FIG. 3 is a sectional view, taken along the direction of advance of the extruded board, of the gauger or sizer upper chamber i.e. along the line III—III of FIG. 6;

FIG. 4 is an enlarged scale view showing in detail the first bars of the gauger plate-like members;

FIG. 5 is a plan view of one plate-like member;

FIG. 6 shows a sectional view taken along the line VI—VI of FIG. 5 and including the vaulted frame of an upper chamber omitted in FIG. 5;

FIG. 7 is a schematic layout view of the gauger.

DESCRIPTION OF PREFERRED EMBODIMENTS

With reference to the cited figures, the extruder head 1 comprises a plug 2 and die 3, which are removably attached to the extruder head 1 by means of through bolts 4 which are effective to clamp together the head 1, plug 2 and die 3.

The plug or male member 2 is provided with a plurality of "V" arranged ducts 5, communicating with an inlet channel 6 for the plastic material being extruded; such ducts 5 converge with their other ends into a common channel 7 defined at the connecting area between the plug 2 and die 3. On the plug 2, a plurality of shaped appendages or lugs 8 are further provided which, in combination with the die 3, define a plurality of passages 9 terminating at the extrusion outlets 10.

Furthermore, a venting duct 11 is provided in the plug 2 which is connected to an interconnecting duct 12 provided in the lugs 8 and communicating, via canalizations 13, to each extrusion outlet 10, and serves to maintain ambient pressure inside the parallel channels defined in the extruded hollow section by the extruder head 1.

Downstream of the extruder head 1 a gauger is provided, denoted generally with the numeral 20, which comprises a lower chamber 21 and an upper chamber 22 communicating each to a vacuum source 21' and 22' respectively.

The lower chamber 21 is closed by a substantially plate-like member 23, which is held in contact with the lower face of the extruded section, whereas the upper chamber 22 is closed by a plate-like member 24 in contact with the upper face of the extruded section.

Said chambers 21 and 22 are each comprised of a vaulted supporting frame 25 attached to one of said plate-like members 23 or 24 by means of peripheral anchoring bolts 26, with the interposition of a sealing gasket 27.

Each of said plate-like members 23 and 24 is comprised of a plurality of bars 28 arranged side by side and spaced apart by a distance adequate to form therebetween slots 29 which are in communication to said chambers. Such bars 28, which extend along a direction substantially perpendicular with respect to the extruded section direction of advance, are held united together by tie rods 30, the latter being perpendicular to the bar direction and serving to clamp together the various bar sets or groups constituting each one plate-like member. More specifically, on the tie rod or member 30, a spacer washer 31 is provided between adjacent bars which is effective to hold apart, by a predetermined distance, each bar from the adjacent one, thus forming said slots 29 for communicating to said chambers, both the lower and upper ones. Moreover, at an intermediate area of the longitudinal extension of said bars, on the side toward the plate-like member arranged inside one of said chambers, a cross-member 32 is provided wherewith fasteners 33 engage which extend from the intermediate portion of the vaulted frame 25 and are effective to support the bar 28 set or group with respect to the vaulted frame 25.

As visible in FIG. 3 the fasteners 33 are in the form of screws screwed into the cross-member 32. Since tie rods 30 hold rigidly together all the bars of the assembly it is sufficient that only some of the bars are connected to the cross-member 32. Such connection may be carried out with screws 32' visible in FIG. 5 and similar to screws 33 shown in FIG. 3.

It should be further added that between the bolt 30a of the tie rod or member 30 and the end bar 28 a cup spring 30b is interposed, being pre-loaded, which is effective to buffer or absorb any variations due to expansion between the bars 28 and tie rods 30, as may arise from the difference in temperature between the bars and tie rods.

In each bar 28, in the proximity of the side thereof contacting the extruded section, a cooling channel 40 extends lengthwise wherein a cooling fluid is circulated by a cooling set denoted generally with the numeral 41 (FIG. 7).

It should be further noted that next to the termination ends of the bars 28, a sealing gasket 43 intervenes between each adjacent bar having the function of preventing harmful leaks of ambient air near the bar ends. Each bar 28, being made of steel, has its side in contact with the section being extruded sand blasted and chromium plated such as to present a perfectly smooth and flat surface in order to ensure a positively uniform surface in the section thus obtained.

The first or foremost of the bars 28, in the direction of advance of the extruded section, has its leading corner 50 beveled such as to facilitate the extruded section introduction within the gauger.

The operation of the inventive system will next be discussed. The desired section is manufactured through the extruder head 1 and, in order to modify the section dimensions, all that is required, with the system according to the invention, is to vary the plug 2 and die 3, thereby the section dimensions are changed at will, and, if desired, the section may be made solid rather than honeycombed as mentioned previously. After exiting the extruder head 1, the section is introduced into the gauger 20 where the section is gradually cooled in order to prevent any distortion that may occur and keep its structure unaltered. To this end provision has been made for the presence of the lower chambers 21 and upper chambers 22, which may be arranged in succession to one another and vary in number to suit specific requirements, said chambers being effective to prevent the hollow section from collapsing due to contraction of the plastic material during the cooling step.

It should be added that a cooling fluid is circulated through each cooling channel 40 within the bars, and moreover, in the various bars, a cooling fluid is circulated having decreasing temperatures in the section direction of advance.

The main feature of the invention resides, however, in that the plate-like members 23 and 24 arranged to close the chambers 21 and 22 are made up, as mentioned above, of bars 28 arranged side by side such that the thermal gradient occurring thereat is prevented from distorting the plate-like members; in fact, each bar is separated from its adjacent one and only connected thereto by cross tie rods 30, the latter having a limited clearance in regards to the bore wherethrough they are passed such as to compensate for any expansion, only in a lengthwise direction of the individual bars. It thus happens that the deformation, e.g. of the initial or foremost bars, i.e. the ones nearest to the extruder head, does not propagate to the following bars, thereby the perfect flatness of the plate-like members is effectively preserved. Furthermore, by making each bar thermally independent from the rest, the extruded section may be cooled gradually, thus preventing a sudden cooling action from causing any unwanted contractions in the extruded section, such as would obviously affect the inherent properties thereof.

To the above, it should be added, moreover, that it is possible to vary at will the distance between the plate-like members 23 and plate-like members 24 so as to adjust them for the varying thicknesses of the sections being extruded.

From the foregoing description it will be apparent that this invention fully achieves the objects intended, and in particular it should be pointed out how the implementation of the gauger plate-like members as a plurality of bars in a side-by-side relationship to each other permits the elimination of the risk that thermal gradients should cause undesired deformations, and it should be noted that any deformations of the bars 28 due to heat are not opposed but simply piloted so that they occur lengthwise with respect to the bars, i.e. in a direction that is not liable to induce stressing of the following bars, and that does not affect the perfect flatness of the plate-like members.

The invention as described above is susceptible to numerous modifications and variations, all of which fall within the scope of the present invention.

Furthermore, all the constructional details may be substituted for with other technically equivalent elements.

In practicing the invention, the materials employed and the dimensions may be any ones to suit specific requirements.

I claim:

1. An apparatus, particularly for manufacturing hollow boards of plastic material, comprising an extruder head for extruding a board and a sizer downstream of said extruder head, said sizer comprising a lower chamber and an upper chamber both communicating with a vacuum source, said lower and upper chambers being respectively closed by a generally plate-like lower member and a generally plate-like upper member respectively contacting a lower face and an upper face of said extruded board arranged to pass therebetween, wherein according to the improvement said generally plate-like lower and upper members comprise a plurality of bars arranged side by side and spaced apart such as to define slots therebetween for communicating respectively with said lower chamber and said upper chamber, said bars extending in a direction substantially perpendicular to the direction of advance of said extruded board.

2. An apparatus according to claim 1, wherein said generally plate-like members further comprise tie members for connecting together said bars and extending perpendicular to the longitudinal direction thereof, said bars having holes for receiving said tie members, and spacer washers arranged between adjacent bars effective to keep said bars apart in order to define said slots.

3. An apparatus according to claim 2, wherein said tie members have a limited clearance in said holes of said bars, to allow said bars to expand upon temperature variation in a longitidinal direction thereof.

4. An apparatus according to claim 1, further comprising a cross-member connected to an intermediate portion of the longitidinal extension of said bars of each plate like member on a side thereof facing the interior of the respective chamber, and fasteners connecting each cross-member to an intermediate portion of a vaulted frame defining each of said respective chambers.

5. An apparatus according to claim 1, further comprising sealing gaskets interposed between said bars in the proximity of their longitudinal ends.

6. An apparatus according to claim 1, wherein, on both plate-like members the foremost of said bars in the direction of advance of said extruded board has its leading corner beveled such as to facilitate the introduction of said extruded board into said sizer.

7. An apparatus according to claim 1, wherein said extruder head comprises a plug and a die removably attached together by means of through bolts.

8. An apparatus according to claim 7, wherein said plug has a plurality of ducts arranged "V"-like and communicating with one end thereof with a plastic material inlet channel for the plastic material being extruded, said "V"-like arranged ducts converging with their other ends to a common channel defined in the interconnecting area between said plug and said die, said plug having further a plurality of shaped lugs which, in cooperation with said die, define a plurality of passages terminating with extrusion outlets.

9. An apparatus according to claim 8, wherein said plug has a venting duct communicating with the ambient air, which is connected to an interconnecting duct provided in said lugs and communicating through canalizations to each outlet of said extrusion outlets.

* * * * *